B. A. PARKES.
AUTOMATIC LOOP DRYING MACHINE.
APPLICATION FILED APR. 15, 1913.
1,125,910.
Patented Jan. 19, 1915.
4 SHEETS—SHEET 2.
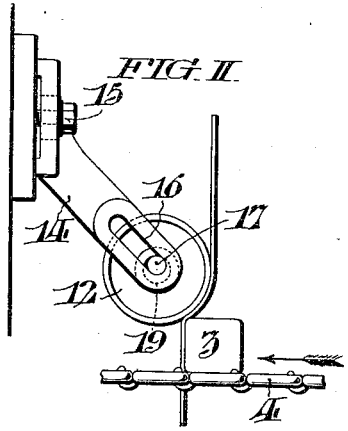
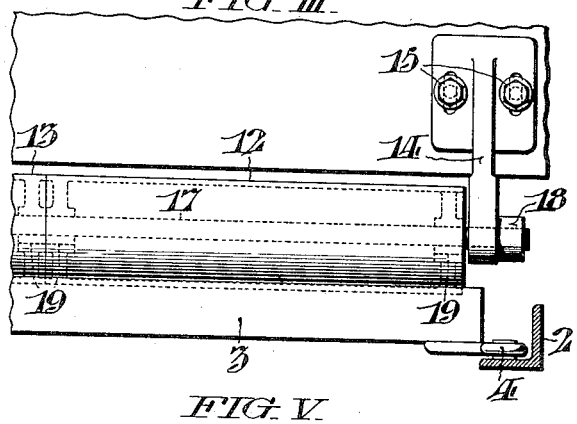
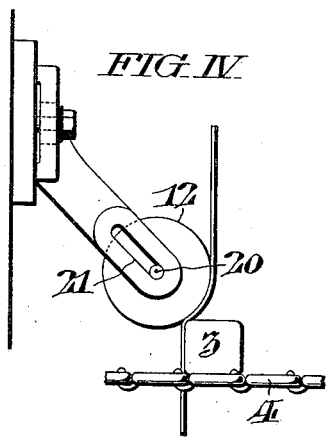
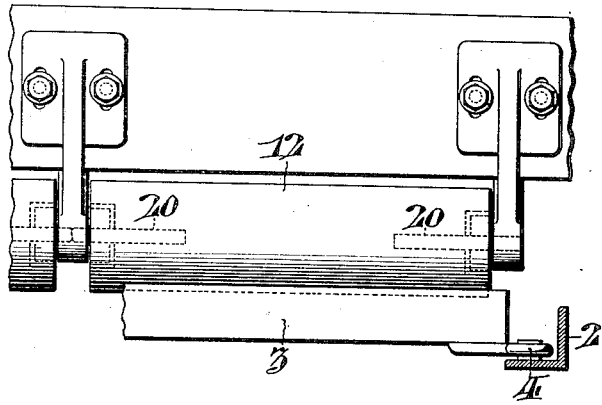
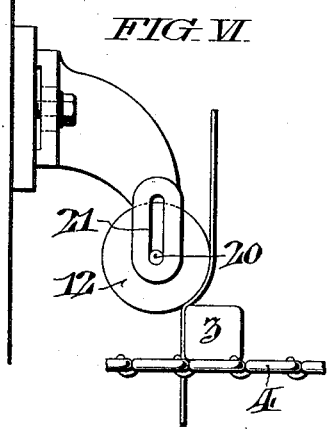
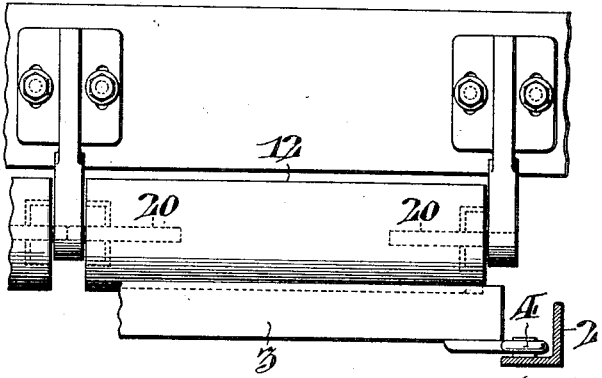
Inventor
Bertrand A. Parkes,
Witnesses

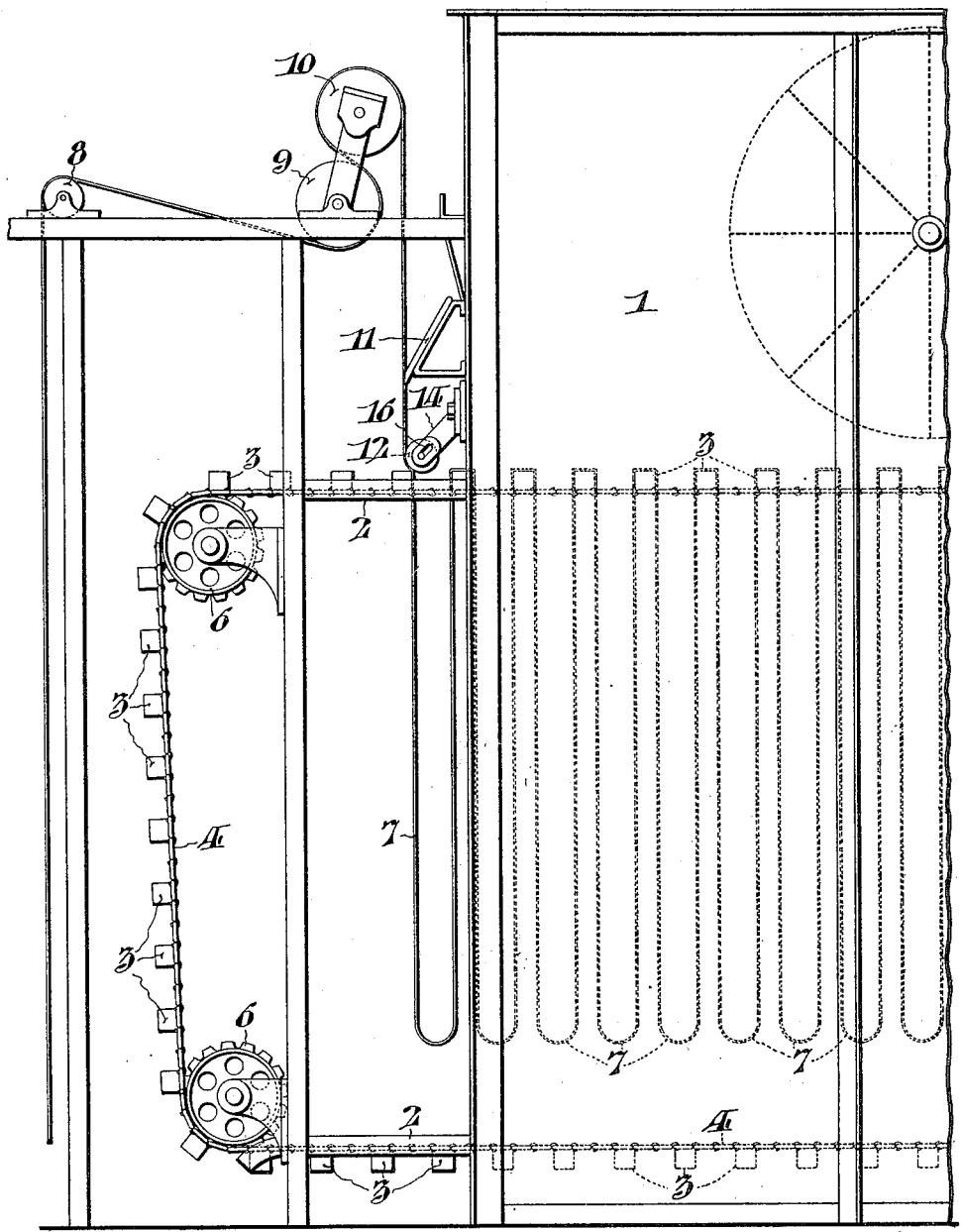

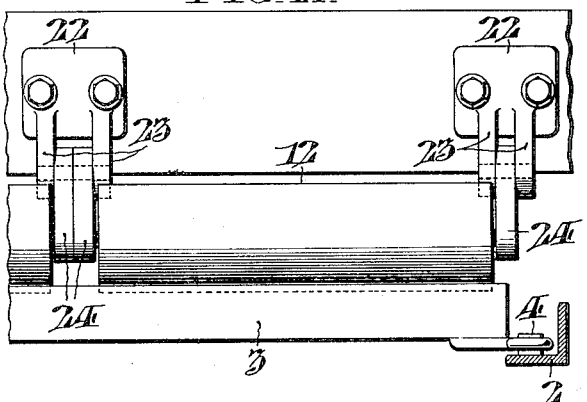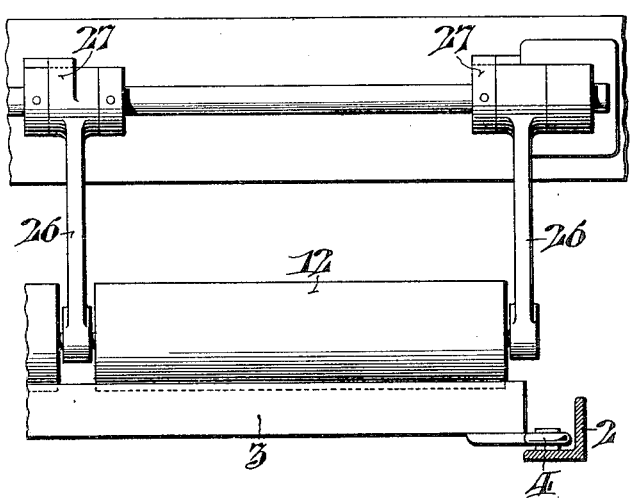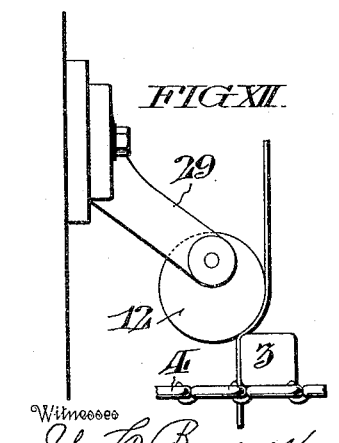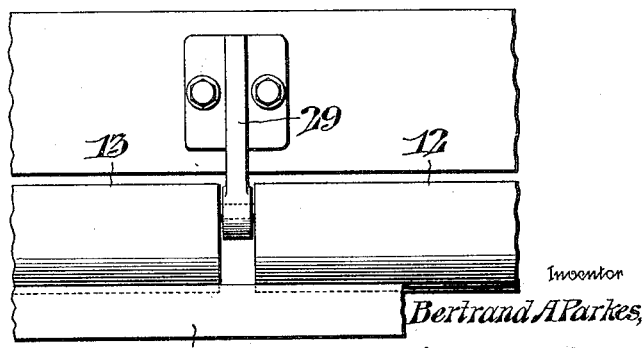

B. A. PARKES.
AUTOMATIC LOOP DRYING MACHINE.
APPLICATION FILED APR. 15, 1913.
1,125,910.  Patented Jan. 19, 1915.
4 SHEETS—SHEET 4.
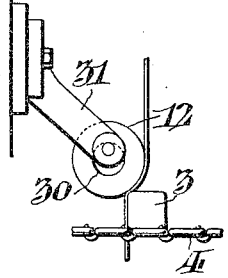
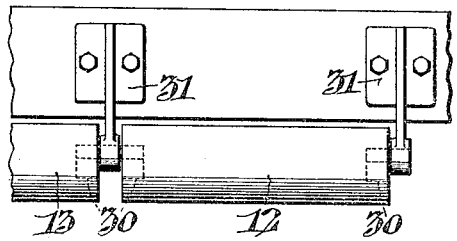
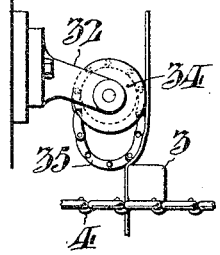
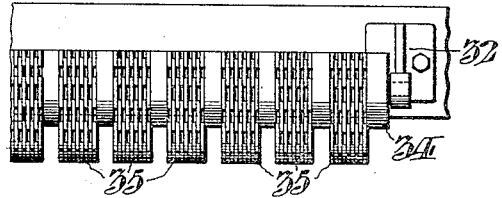
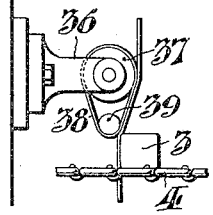
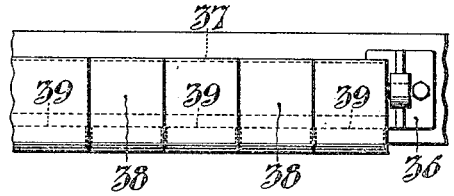
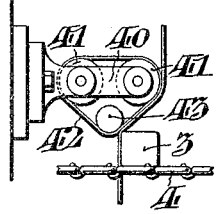
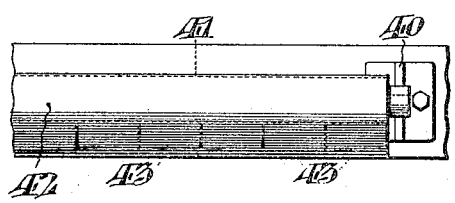
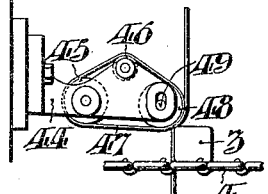
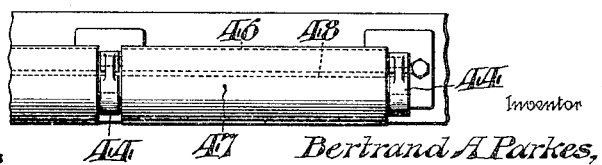
Witnesses
John C. Bergner
James H. Bell
Inventor
Bertrand A. Parkes,
By Riley & Paul
Attorneys

UNITED STATES PATENT OFFICE.

BERTRAND A. PARKES, OF BARREN HILL, PENNSYLVANIA, ASSIGNOR TO THE PHILADELPHIA DRYING MACHINERY COMPANY, OF PHILADELPHIA, PENNSYLVANIA, A CORPORATION OF PENNSYLVANIA.

AUTOMATIC LOOP-DRYING MACHINE.

1,125,910.      Specification of Letters Patent.      Patented Jan. 19, 1915.

Application filed April 15, 1913. Serial No. 761,244.

*To all whom it may concern:*

Be it known that I, BERTRAND A. PARKES, of Barren Hill, in the county of Montgomery and State of Pennsylvania, have invented new and useful Improvements in Automatic Loop-Drying Machines, whereof the following is a specification, reference being had to the accompanying drawings.

The invention relates more particularly to drying machines wherein the fabric to be dried is hung in looped form from an endless traveling conveyer passing through the drying apparatus.

An object of the invention is to provide devices for forming the loops over the supporting poles or bars of the endless conveyer, which devices are so constructed that they will automatically adjust themselves to permit the supporting pole to pass underneath the device, without in any way crushing or injuring the fabric which is being placed on the supporting poles.

A further object of the invention is to provide devices of the above character, which are so constructed and timed in their operation that the fabric is firmly held on a supporting pole until the next succeeding loop is partially formed.

These and other objects will in part be obvious, and will in part be hereinafter more fully disclosed.

In the drawings Figure I, is a side elevation, showing a portion of a drying machine having my improvements applied thereto. Fig. II, is an enlarged end view, showing the roll for holding the fabric on the supporting pole during the formation of a new loop. Fig. III, is a side view of a portion of the rolls, showing the parts directly associated therewith. Fig. IV, is a view similar to Fig. II, showing a modified form of the invention. Fig. V, is a view similar to Fig. III, showing the construction illustrated in Fig. IV. Fig. VI, is a view similar to Fig. II, showing another modified form of the invention. Fig. VII, is a view similar to Fig. III, showing the structure illustrated in Fig. IV. Fig. VIII, is a view similar to Fig. II, showing another form of the invention. Fig. IX, is a view similar to Fig. III, showing the structure of Fig. VIII. Fig. X, is a view similar to Fig. II, showing another modified form of the invention. Fig. XI, is a view similar to Fig. III, showing the structure of Fig. X. Fig. XII, is a view similar to Fig. II, showing another modified form of the invention. Fig. XIII, is a view similar to Fig. III, showing the structure of Fig. XII. Fig. XIV, is a view similar to Fig. II, showing another modified form of the invention. Fig. XV, is a view similar to Fig. III, showing the structure of Fig. XIV. Fig. XVI, is a view similar to Fig. II, showing another modified form of the invention. Fig. XVII, is a view similar to Fig. III, showing the structure of Fig. XVI. Fig. XVIII, is a view similar to Fig. II, showing another modified form of the invention. Fig. XIX, is a view similar to Fig. III, showing the structure of Fig. XVIII. Fig. XX, is a view similar to Fig. II, showing another modified form of the invention. Fig. XXI, is a view similar to Fig. III, showing the structure of Fig. XX. Fig. XXII, is a view similar to Fig. II, showing another modified form of the invention. Fig. XXIII, is a view similar to Fig. III, showing the structure of Fig. XXII.

The drying machine to which my invention is applied consists generally of an inclosed casing 1, which is provided with suitable angle guide bars 2, (see Fig. III), along which slide supporting poles or bars 3. These supporting poles are attached to an endless chain 4, at suitable intervals. The bar or pole is preferably attached to the chain at the lower side of said pole. These poles with the endless chains make up a conveyer, which runs over suitable sprockets 6, 6, at each end of the drying machine, and the conveyer is suitably driven, so that the poles are slowly and continuously moved through the drying machine. The angle guide bars 2, are disposed at some distance from the bottom of the drying machine, as clearly shown in Fig. I, so that the fabric may be hung in loops, as indicated at 7, in the drawing, from said poles. The fabric is led to the machine over an idle roll 8, then under and over rolls 9, and 10, and by a guide board 11. In laying the fabric in loops over the poles, it is essential that the loops shall be of substantially uniform length. If the loops are too short, then the capacity of the machine is decreased, and if they are too long, so as to drag in the parts of the drying machine, then the fabric is soiled. In order to form and regulate the length of the loops, I have provided devices which engage the fabric as the poles are moved underneath the devices, and these devices hold the fabric on the poles lightly so as not to injure the fabric in any way, and yet with sufficient force to clamp the fabric about the pole, and cause a new loop to be formed between the pole which is clamped, and the next succeeding pole. In the drawings I have shown several modified forms of devices for accomplishing this clamping of the fabric, and the forming of the new loops.

In Figs. I, II, and III, I have shown the clamping device as consisting of a plurality of rolls 12, and 13. As shown in Fig. III, these rolls are carried by brackets 14, which are slotted and adjustably secured by bolts 15, to the frame of the drying machine. At the lower end each bracket is provided with an inclined slot 16. A rod 17, extends from one end of the machine to the other, and rests in said inclined slot. Said rod may be held from endwise movement by suitable collars, one of which is shown at 18, in Fig. III. These collars, however, permit the free movement of the rod in the inclined slot. Each roll is hollow and is formed with a disk at each end, and these disks are each provided with an opening 19, which is slightly larger than the rod 17. This permits of a slight movement of the roll on the rod in a direction transversely the axis of the rod. The rolls at the same time are free to rotate about the rod as a supporting bearing. In Fig. II, I have indicated by an arrow the direction of travel of the supporting poles 3. The fabric which has formed the last loop 7, as indicated in Fig. I, is clamped between the roll 12, and the supporting pole 3, by a movement of the pole through the travel of the endless conveyer. This roll is preferably so disposed that the lower face thereof is normally slightly beneath the upper face of the pole. As a result, the fabric will be bent over the pole and the weight of the roll will clamp the fabric on the pole. As the pole travels slowly underneath the roll, the fabric will be fed over the pole and form a new loop. The travel of the pole is such that the fabric will be clamped until the loop is partially formed, after which the roll will pass off from the pole and the fabric will be free until another pole clamps the same against the roll. Inasmuch as a plurality of webs are usually passed through the drying machine side by side, I have provided a plurality of rolls as indicated above, one roll operating to clamp each web. The forming of the rings or disks, which support the rolls, with a larger opening therein than the diameter of the supporting rod permits the roll to move vertically about the supporting rod, and to pass over the top of the pole, and thereby each roll has an independent movement. The rod is also free to move up the inclined slot in the supporting bracket 14, and this allows all the rolls to move vertically. By this means I have provided a construction, wherein the clamping roll may move automatically vertically or in such direction as to permit the pole to pass underneath the same, and at the same time rest on the fabric and clamp the same against the pole with sufficient force to hold the fabric from slipping on the pole while the new loop is being formed. Inasmuch as the poles travel at a uniform rate of speed, the lengths of the loops will be uniform, as the speed of travel of the poles determines the length of the loops, assuming that the feed of the fabric to the drying machine is uniform.

In Figs. IV, and V, I have shown a slightly modified form of the invention as in the structure in these figures each roll is supported independently by brackets arranged at each end of the roll. The roll 12, is formed with projecting pins 20, and these pins are located in inclined slots 21, formed in the supporting brackets. The movement of the pins in the inclined slots permits the rolls to lift automatically as the poles pass underneath the same.

In Figs. VI, and VII, I have shown a structure similar to that shown in Figs. IV, and V, except that the end of the bracket is so constructed that the slot 21, therein is vertical, instead of inclined. The operation of this roll in other respects is precisely the same as that described in connection with Figs. IV, and V. In Figs. VIII to XI, inclusive, I have shown a still different method of supporting the roll, so that the roll may automatically move in substantially vertical direction to permit the pole to pass underneath the same. In each of these views the roll is mounted on a swinging bracket arm.

In Figs. VIII and IX, the supporting brackets 22, are each provided with outwardly projecting lugs 23, and swinging arms 24, are pivoted to these lugs. There is a pair of arms for each roll, and the roll 12, is pivoted in the outer end of said arms. As the pole 3, contacts with the roll 12, it engages the same at a point some distance below the pivotal center of the roll, and the movement of the pole will swing the bracket 24, so as to allow the roll to pass over the pole. A stop lug 25, holds the bracket arm in proper position for the roll to engage the pole in the manner above stated.

In Figs. X, and XI, the arms 26, which support the rolls are permitted to swing toward the drier frame at the lower ends, and stops 27, limit the movements of the arms. These arms are also slotted as at 28, to permit a slight vertical movement of the roll relative to the supporting arms.

In Figs. XII, and XIII, I have shown the rolls 12, and 13, as pivoted to a rigid bracket arm 29, at a point one side of the center of the roll. This eccentric mounting of the roll permits the roller to turn about the pivotal point thereof, and in so turning, to rise sufficiently to allow the pole to pass underneath the same.

In Figs. XIV and XV, I have shown the rolls 12, and 13, each provided with a concentric recess 30, in its outer end, and projecting bearing studs carried by the bracket arms 31, extend into these recesses. These bearing studs are of considerable less diameter than the diameter of the recess which permits the clamping roll to rise automatically as the pole passes underneath the same.

In Figs. XVI, and XVII, I have shown the bracket arms 32, as fixed and carrying a roller 34, which is held from vertical movement, and this roller is preferably grooved at suitable spaced intervals. Located within the groove in each roller is an endless link chain 35. This link chain is of considerable width, and is formed by placing a series of links side by side. The link chain is also of larger diameter than the diameter of the supporting roller therefor, so that said link chains will hang from the roller 34. The position of the roller 34, and the length of the chains are such that the pole 3, will move the fabric into contact with this chain, and the roller and the chain will yield at its lower face to permit the pole to pass underneath the same.

In Figs. XVIII and XIX, I have shown fixed brackets 36, which support a roller 37, which is held from vertical movement in the brackets, and this roller 37, supports a plurality of independent flexible belts 38, which are slightly larger than the diameter of the roller, and a small weighted roll 39, rests in the lower end of the loop formed by each belt. This belt is of such length and the bracket is so positioned relative to the poles that the fabric will be clamped against the pole by the belt, and the weighted roll 39, aids in this clamping action. The flexible belt will yield to permit the roll 39, to rise and pass over the pole.

In Figs. XX, and XXI, I have shown a construction wherein fixed brackets 40, support two spaced rollers 41, and a flexible belt 42, runs over these two rollers in a manner similar to that described in connection with Figs. XVIII and XIX. This belt preferably extends from end to end of the roller 41. A series of weighted rolls 43, are placed in and supported by this flexible belt. The method of operation of this structure is similar to that described in connection with Figs. XVIII and XIX.

In Figs. XXII and XXIII, I have shown a series of fixed brackets 44, which support a series of rollers 45, and 46, which are mounted so as to turn in the brackets, but prevented from vertical movement relative to the brackets. An endless belt 47, passes over these rollers, and also over a roller 48, which is formed with projecting pins 49, guided in the slotted ends of the brackets 44. This slotted end of the bracket permits the roller 48, and the belt passing over the same to rise to allow the pole 3, to pass underneath the same.

It will be noted that in each instance I have provided means which are capable of being moved vertically or substantially vertically, so as to allow the pole to press the fabric against this clamping means, and the clamping means to rise, so that the pole may pass underneath the same. This clamping means in each instance is also capable of being turned to move with the fabric, as well as raised, which prevents any dragging or drawing of the clamping means on the surface of the fabric which would tend to injure the same.

Having thus described my invention, I claim:

1. A drying apparatus including in combination, an endless conveyer, spaced supporting poles carried thereby on which a series of loops of fabric may be suspended side by side, and independent clamping devices for each web of fabric for clamping the same against the pole for starting a new fabric loop.

2. A drying apparatus including in combination, an endless conveyer, spaced supporting poles carried thereby on which a series of loops of fabric may be suspended side by side, and a clamping mechanism for clamping and holding the webs against the pole for starting the new fabric loops, said clamping mechanism including supporting brackets, a series of weighted elements, one for each web to be dried, and means for supporting said elements on the brackets, whereby each element may be moved independently of the others for permitting the pole to pass underneath the same.

3. A drying apparatus including in combination, an endless conveyer, spaced supporting poles carried thereby on which a series of loops of fabric may be suspended side by side, and a clamping mechanism for clamping and holding the webs against the pole for starting the new fabric loops, said clamping mechanism including supporting brackets, a series of rolls supported thereby, one for each web of fabric, and means whereby all of said rolls may rise to permit the poles to pass underneath the same and whereby each roll may be raised independently of the other.

In testimony whereof, I have hereunto signed my name at Philadelphia, Pennsylvania, this tenth day of April 1913.

BERTRAND A. PARKES.

Witnesses:
JAMES H. BELL,
E. L. FULLERTON.

Copies of this patent may be obtained for five cents each, by addressing the "Commissioner of Patents, Washington, D. C."